United States Patent
Xu

(10) Patent No.: US 12,277,042 B1
(45) Date of Patent: Apr. 15, 2025

(54) MEMORY DEVICE INSERTION POLICY BASED ON NAMESPACE RANGE

(71) Applicant: International Business Machines Corporation, Armonk, NY (US)

(72) Inventor: Huiying Xu, Morton Grove, IL (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 18/489,906

(22) Filed: Oct. 19, 2023

(51) Int. Cl.
 G06F 11/00 (2006.01)
 G06F 11/20 (2006.01)

(52) U.S. Cl.
 CPC .................. G06F 11/2094 (2013.01)

(58) Field of Classification Search
 CPC .... G06F 11/2094; G06F 3/0607; G06F 3/061; G06F 3/0629; G06F 3/0631; G06F 3/0644; G06F 3/0647; G06F 3/0683
 See application file for complete search history.

(56) References Cited

U.S. PATENT DOCUMENTS

| | | | |
|---|---|---|---|
| 8,595,346 B2 | 11/2013 | Bairavasundaram et al. | |
| 9,805,054 B2 | 10/2017 | Davis et al. | |
| 10,365,968 B2 | 7/2019 | Motwani | |
| 11,151,093 B2 | 10/2021 | Roberson, II et al. | |
| 11,567,810 B1 | 1/2023 | Kenney et al. | |
| 11,656,924 B2 | 5/2023 | Ganesh et al. | |
| 2015/0242150 A1* | 8/2015 | Sorenson, III | G06F 3/0647 711/114 |
| 2017/0123976 A1* | 5/2017 | Motwani | H04L 9/14 |
| 2019/0303006 A1* | 10/2019 | Wozniak | G06F 3/067 |
| 2023/0058424 A1* | 2/2023 | Frolikov | G06F 3/0659 |

OTHER PUBLICATIONS

Slice Data Rebalancing Policy Based on Uniform Namespace Allocation across All Memory Devices, Mar. 1, 2017, Ip.com (Year: 2017).*
Zheng et al., "DeltaFS: Exascale File Systems Scale Better Without Dedicated Servers," Proceedings of the 10th Parallel Data Storage Workshop, 2015, pp. 1-6.

* cited by examiner

Primary Examiner — Marc Duncan
(74) Attorney, Agent, or Firm — CANTOR COLBURN LLP; Teddi Maranzano

(57) ABSTRACT

Embodiments relate to determining legal positions as candidate positions for inserting a memory device in memory devices and determining a namespace range migration cost for the candidate positions based on a balanced state for a namespace range distributed across the memory devices. An insertion position to insert the memory device in the memory devices is selectable from the candidate positions. A given candidate position is selected with a minimum namespace range migration cost corresponding to a requirement to transfer data between the memory devices to result in the balanced state for the namespace range across the memory devices. The given candidate position is the insertion position to insert the memory device in the memory devices. Responsive to inserting the memory device at the insertion position in the memory devices, a transfer occurs of the data in the memory devices in accordance with the insertion position of the memory device.

20 Claims, 14 Drawing Sheets

NAMESPACE RANGE MIGRATION COST FROM D8 TO D5, D8 TO D6, AND D8 TO D7

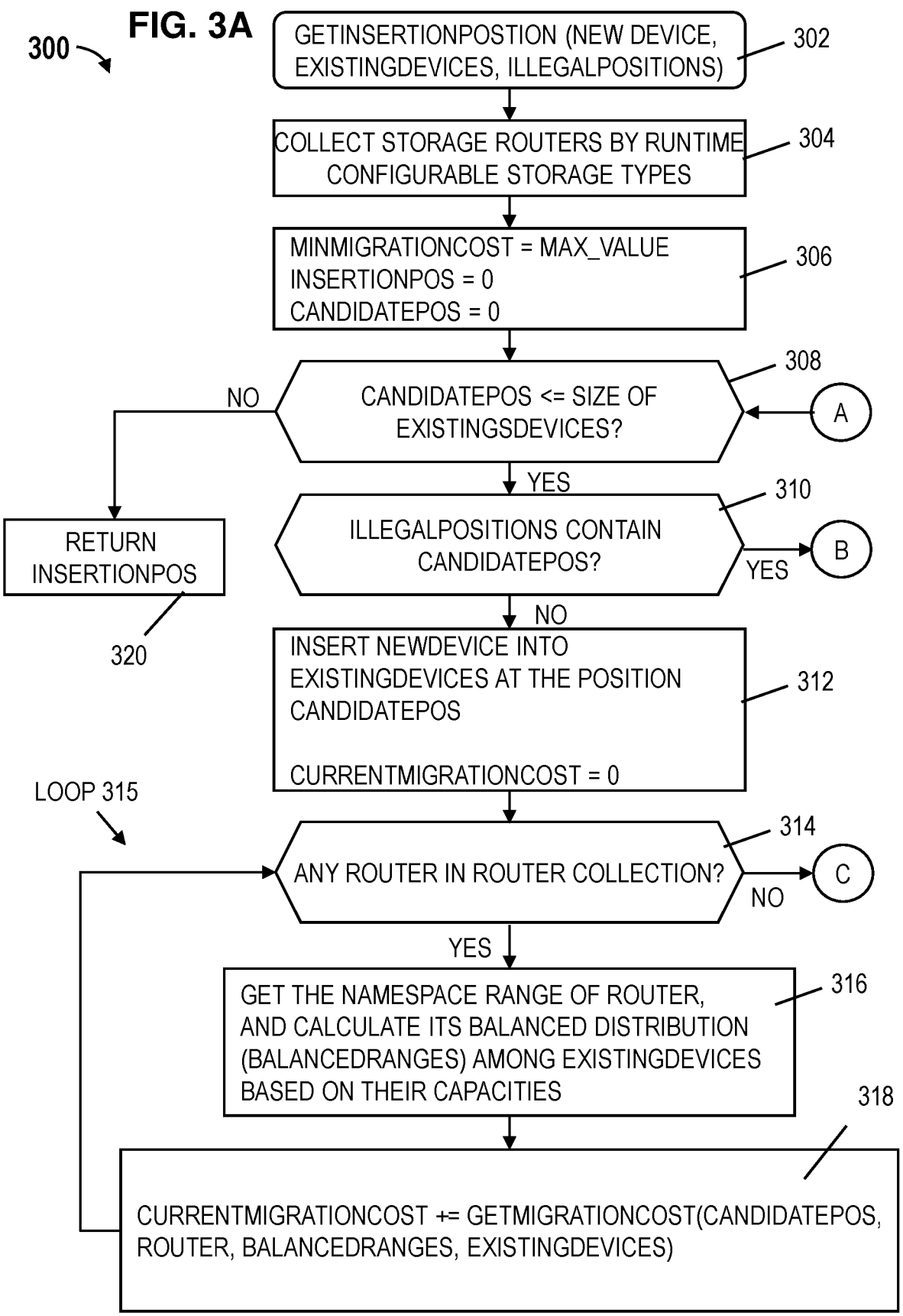

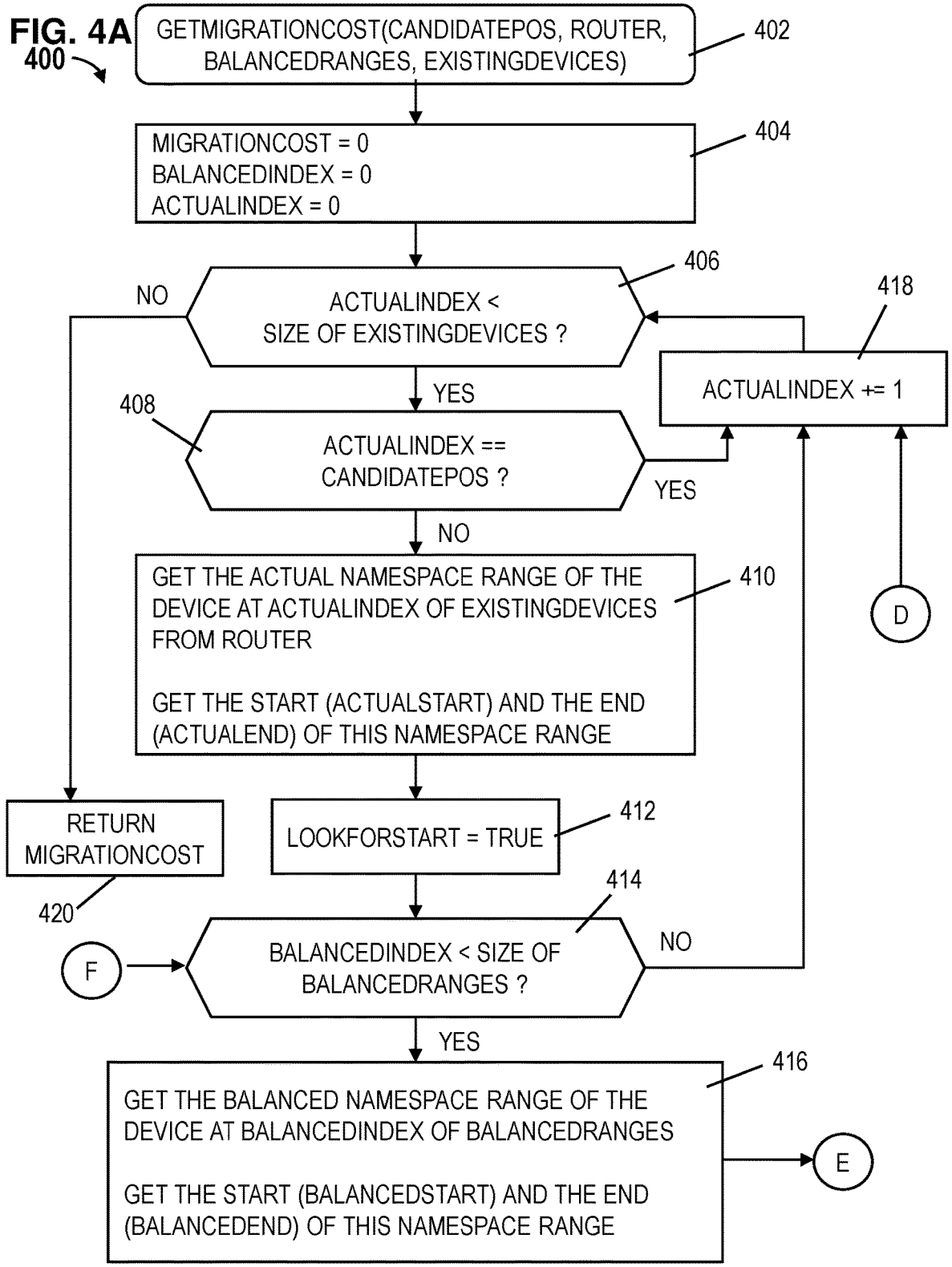

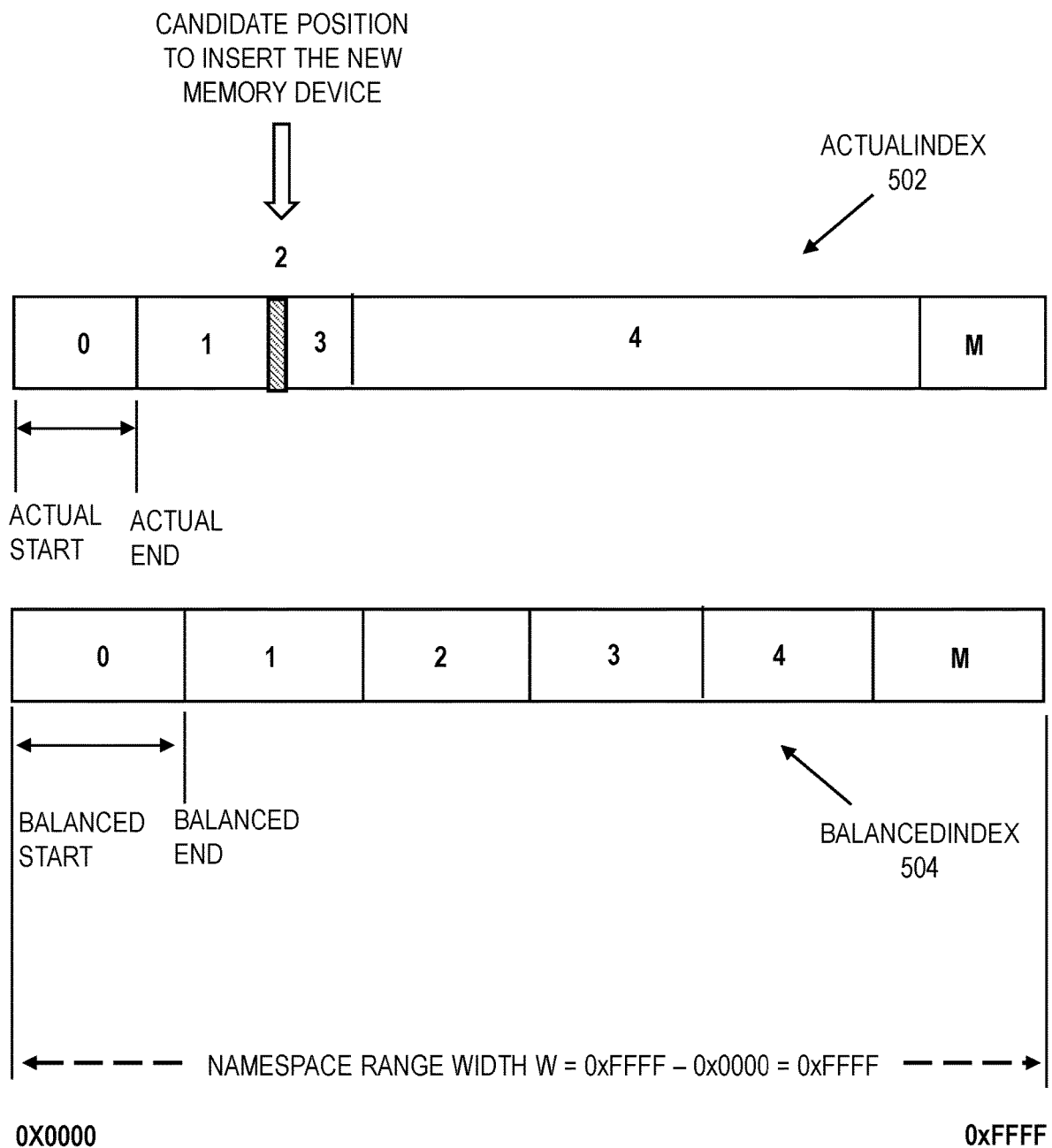

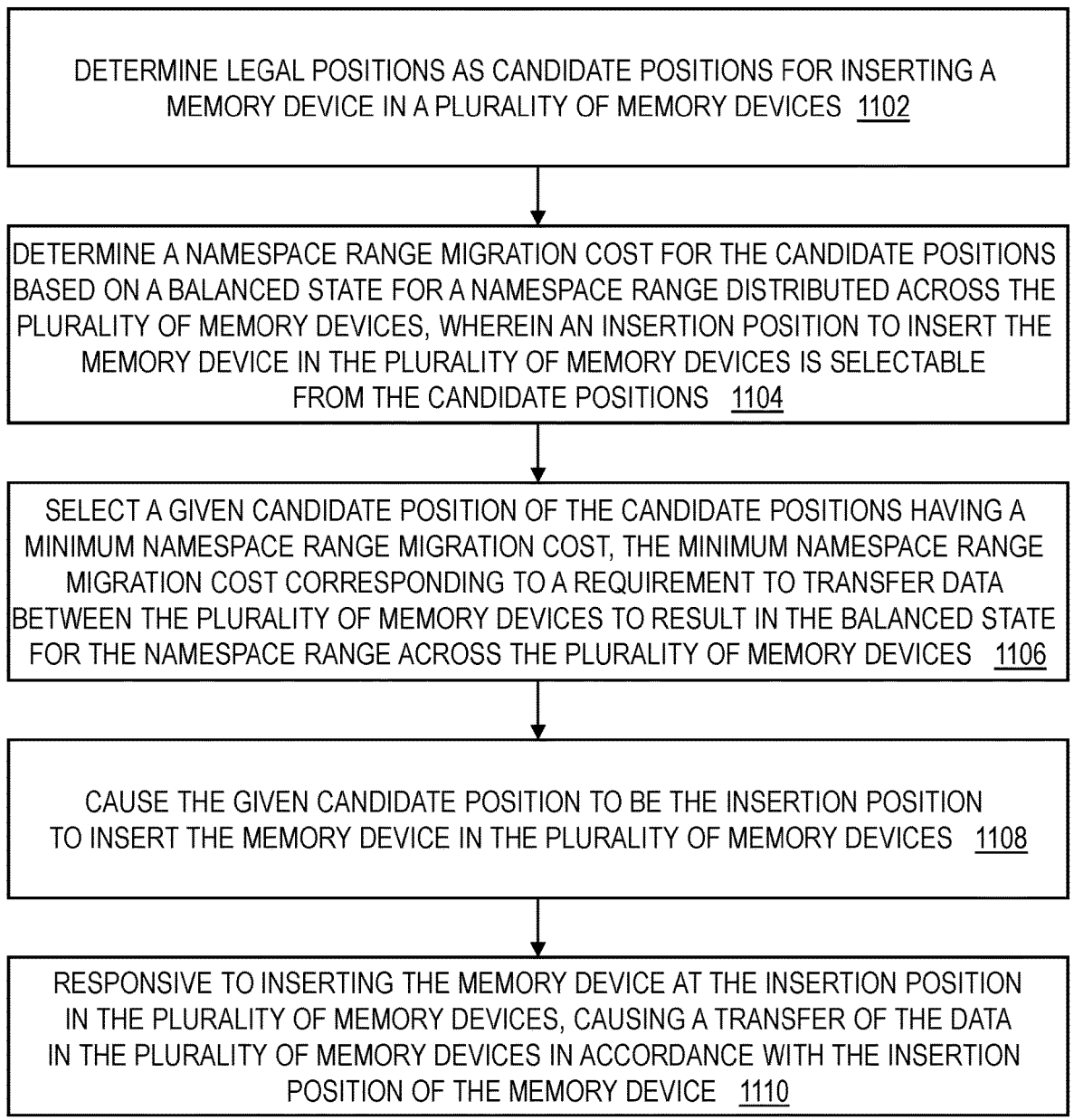

MEMORY DEVICE INSERTION POLICY BASED ON NAMESPACE RANGE

BACKGROUND

The present invention generally relates to computer systems, and more specifically, to computer-implemented methods, computer systems, and computer program products configured and arranged to provide a memory device insertion policy based on namespace range for determining an insertion position, in order to insert a memory device into a memory storage system at the determined insertion position.

Enterprise data centers typically include large numbers of storage devices that can be accessed using high-speed networks. However, the management overhead for a large number of storage devices can become substantial. For instance, maintaining data consistency, redundancy, and storage system performance in the presence of hard disk drive failures can involve substantial time, effort, and expertise.

SUMMARY

Embodiments of the present invention are directed to computer-implemented methods for a memory device insertion policy based on namespace range. A non-limiting computer-implemented method includes determining legal positions as candidate positions for inserting a memory device into a plurality of memory devices and determining a namespace range migration cost for each of the candidate positions based on a balanced state for a namespace range distributed across the plurality of memory devices, where an insertion position to insert the memory device into the plurality of memory devices is selectable from the candidate positions. The method includes selecting a given candidate position of the candidate positions having a minimum namespace range migration cost, the minimum namespace range migration cost corresponding to a requirement to transfer data between the plurality of memory devices to result in the balanced state for the namespace range across the plurality of memory devices. Also, the method includes causing the given candidate position to be the insertion position to insert the memory device into the plurality of memory devices. The method includes responsive to inserting the memory device at the insertion position in the plurality of memory devices, causing a transfer of the data in the plurality of memory devices in accordance with the insertion position of the memory device.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B depict a flowchart for executing a memory device insertion policy based on namespace range to insert a new memory device into memory devices in a memory storage system with a minimum namespace range migration cost according to one or more embodiments of the present invention;

FIGS. 4A and 4B depict a flowchart for determining a namespace range migration cost for a candidate position to insert a new memory device into memory devices in a memory storage system according to one or more embodiments of the present invention.

FIG. 5 depicts an example actual index of actual namespace ranges for memory devices and an example balanced index of balanced namespace ranges of the memory devices according to one or more embodiments of the present invention;

FIG. 11 depicts a flowchart of a computer-implemented method for executing a memory device insertion policy based on namespace range to determine an insertion position for inserting a new memory device into memory devices in a memory storage system to have the minimum namespace range migration cost according to one or more embodiments of the present invention.

DETAILED DESCRIPTION

Figure 1:
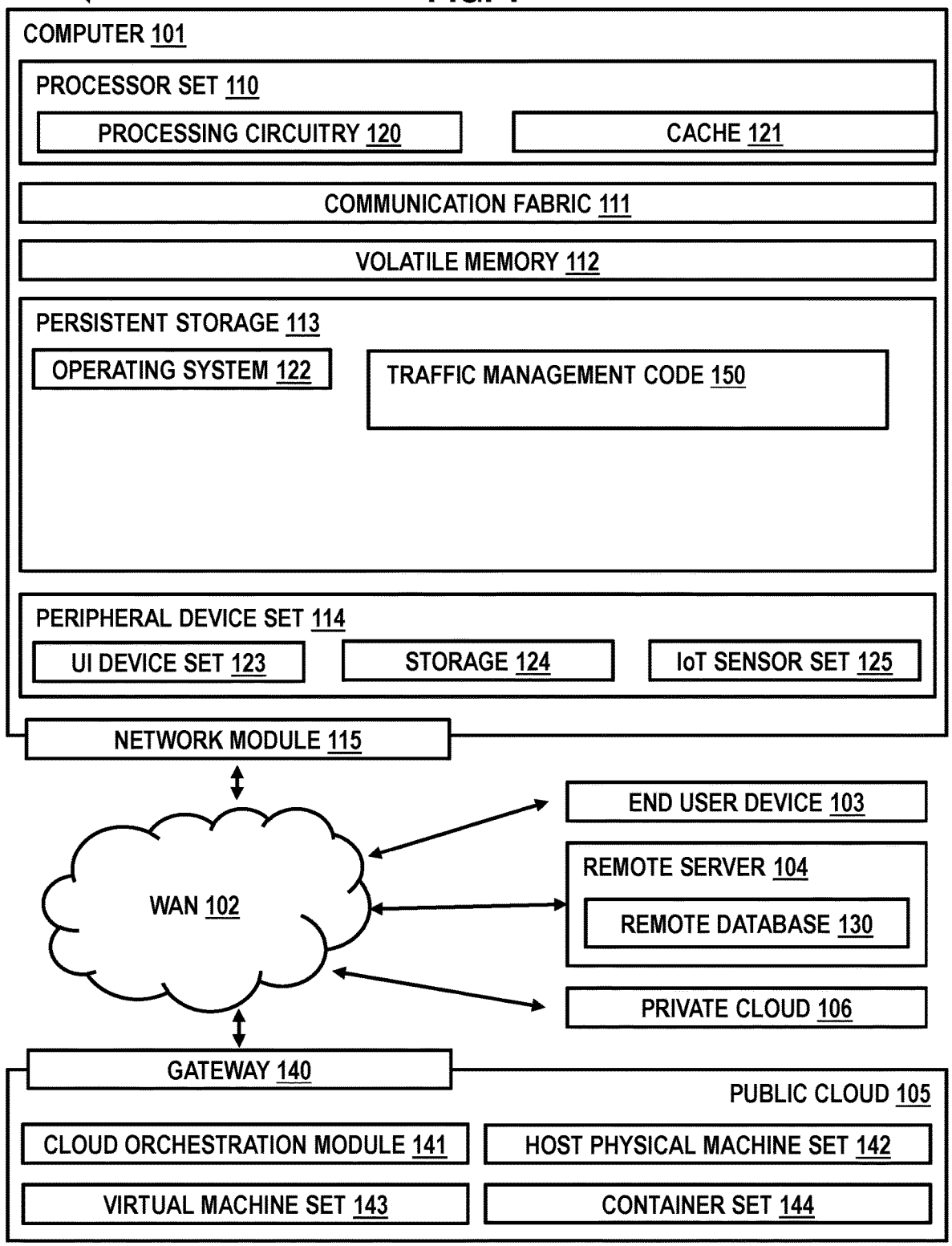
FIG. 1 depicts a block diagram of an example computing environment for use in conjunction with one or more embodiments of the present invention.

One or more embodiments of the invention describe computer-implemented methods, computer systems, and computer program products configured and arranged to provide a memory device insertion policy based on namespace range for determining an insertion position, in order to insert a new memory device into a memory storage system at the determined insertion position.

One or more embodiments provide a technique to determine and utilize a namespace range migration cost to determine the insertion position to insert a new memory device into a group of memory devices. For each storage type, there is a storage router that has its own namespace range. The memory devices in a memory storage system share this namespace range, and each owns a portion. The balanced state is reached when each memory device owns the portion of namespace range by the ratio of its capacity to the summation of all memory device capacities. For example, if there are three memory devices and each memory device has the same capacity for storage, the balanced state is reached when each of the three memory devices owns a one-third portion of the namespace range. The memory devices are ordered in the internal memory device order, such that only adjacent memory devices own the namespace ranges adjacent to each other, so the namespace range migration can only happen between two adjacent memory devices in the memory device order. Based on the namespace range migration cost, the technique considers a collection of storage types that are runtime configurable and considers all the legal memory device insertion positions in the memory device order. For each insertion position, the technique considers all the storage routers given in the collection of storage types. For each storage router, the technique determines the ideal (balanced) distribution of namespace ranges among memory devices (e.g., disks) based on memory device capacities and calculates the namespace range migration cost for each of candidate insertion positions. Further, the technique calculates the total namespace range migration cost for all the storage routers in each candidate insertion position and finds the candidate position with the minimum namespace range migration cost as the insertion position.

One or more embodiments find the best insertion position among the existing memory devices to insert a new memory device so that the namespace range migration cost is minimum to reach the balanced state after the insertion. The migration cost could be very expensive in terms of high CPU and memory usages, and the migration could take days, weeks and even months, if the new memory device was not put into the optimized position. By determining and inserting the new memory device at the determined insertion position with the minimum namespace range migration cost, one or more embodiments reduce the CPU usage, reduce the memory usage, reduce the bandwidth, and reduce the amount of time required to transfer the data for the namespace range to result in a balanced state for the namespace range across the memory devices.

The data in memory devices may contain hundreds, thousands, and/or millions of blocks of data, all of which is referred to as "big data". In accordance with one or more embodiments, the enormous size of the data requires management, processing, and search by a machine (such as computer 101), for example, using computer-executable instructions, and the data could not be practically managed, stored, analyzed, and/or processed as discussed herein within the human mind. Embodiments can process the data and transfer data from one computer to another computer (or one memory device to another memory device) during an emergency to avoid data loss, data corruption, etc., while reducing bandwidth across the network according to aspects discussed herein. Accordingly, the data transfer can implement known techniques as understood by one of ordinary skill in the art. One or more embodiments improve the operations of computers and networks that connect computers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as memory device insertion code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
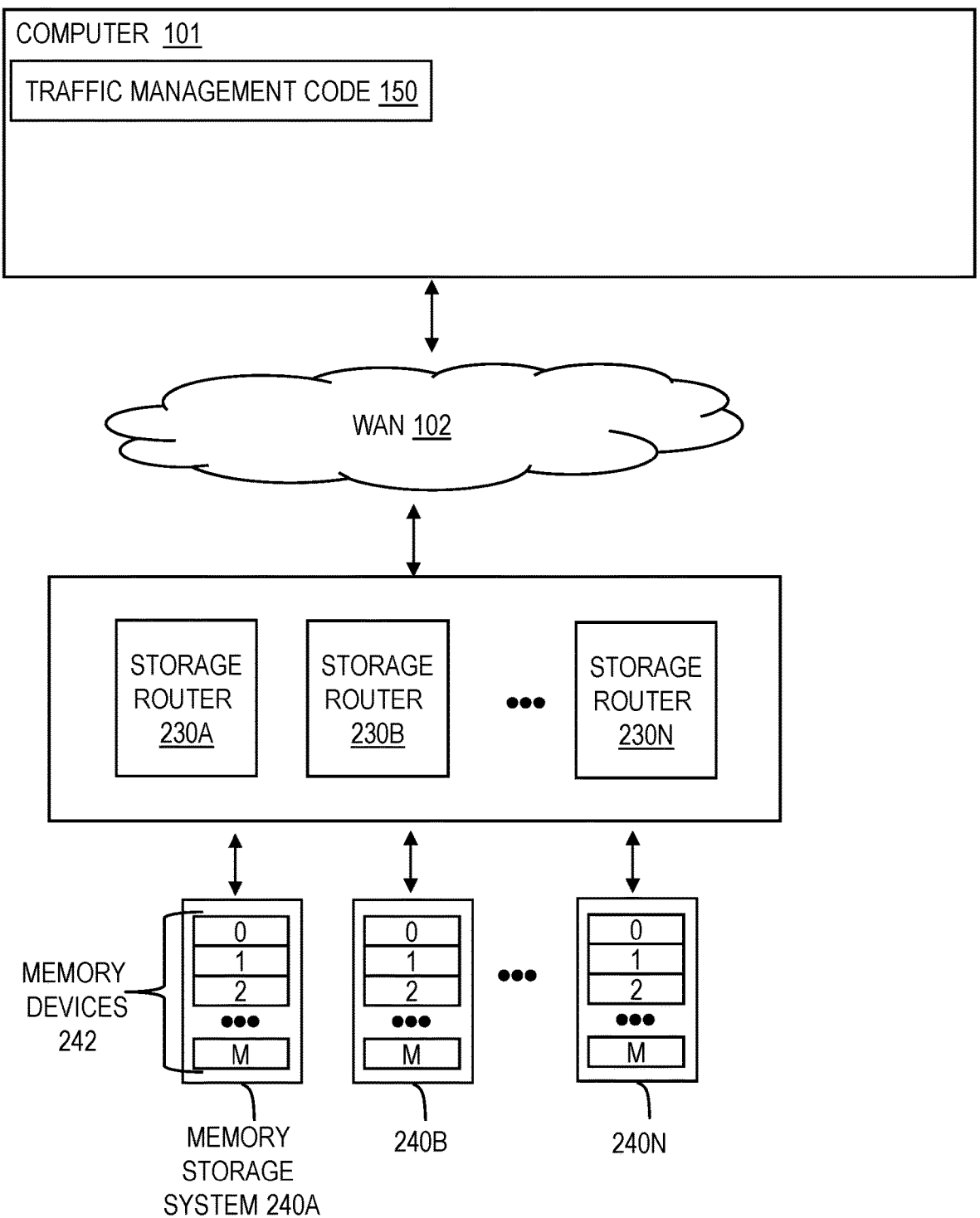
FIG. 2A depicts a block diagram of the example computing environment illustrating further details for executing a memory device insertion policy based on namespace range to insert a new memory device into memory devices in a memory storage system with a minimum namespace range migration cost according to one or more embodiments of the present invention.

FIG. 2A depicts the computing environment 100 with further details for executing a memory device insertion policy based on namespace range according to one or more embodiments. In FIG. 2A, some details of the computing environment 100 may be omitted so as not to obscure the figure while new details are presented. The memory device insertion code 150 can include and/or call other software to operate as discussed herein. The memory device insertion code 150 can include and/or call one or more application programing interfaces (APIs), software modules, etc. The computer 101 can include and/or be coupled to memory storage systems 240A, 240B, through 240N, which can generally be referred to as memory storage systems 240.

Each memory storage system 240 has its own memory devices 242 functionally connected to store data. For example, the memory storage system 240A includes its own memory devices 242 functionally connected to one another. The memory storage system 240B includes its own memory devices 242 functionally connected to one another. Similarly, the memory storage system 240N includes its own memory devices 242 functionally connected to one another. The memory devices 242 can be any type of memory including hard disk drives, solid state memory drives, etc. The memory devices 242 of a memory storage system 240 may be housed in a rack or other physical structure, such that a new memory device 242 can be inserted at an insertion position for operation in the memory storage system 240. The memory devices 242 in a memory storage system 240 can cover a namespace range.

A collection of the memory devices 242 can be a dispersed storage unit. The memory devices in a dispersed storage unit are balanced by the distribution of either fullness or namespace range, depending on the rebalancing policy. The fullness is the ratio of data usage to the capacity. If the rebalance policy is fullness based, all the memory devices will have the same fullness after rebalancing. If the rebalance policy is namespace range based and the balanced state is reached, the width of namespace range that a memory device owns is decided by the whole namespace range width multiplied by the ratio of this memory device capacity to the summation of all the memory device capacities. If all the memory devices have the same capacity, the memory devices will have the same namespace range width.

Figure 2B:
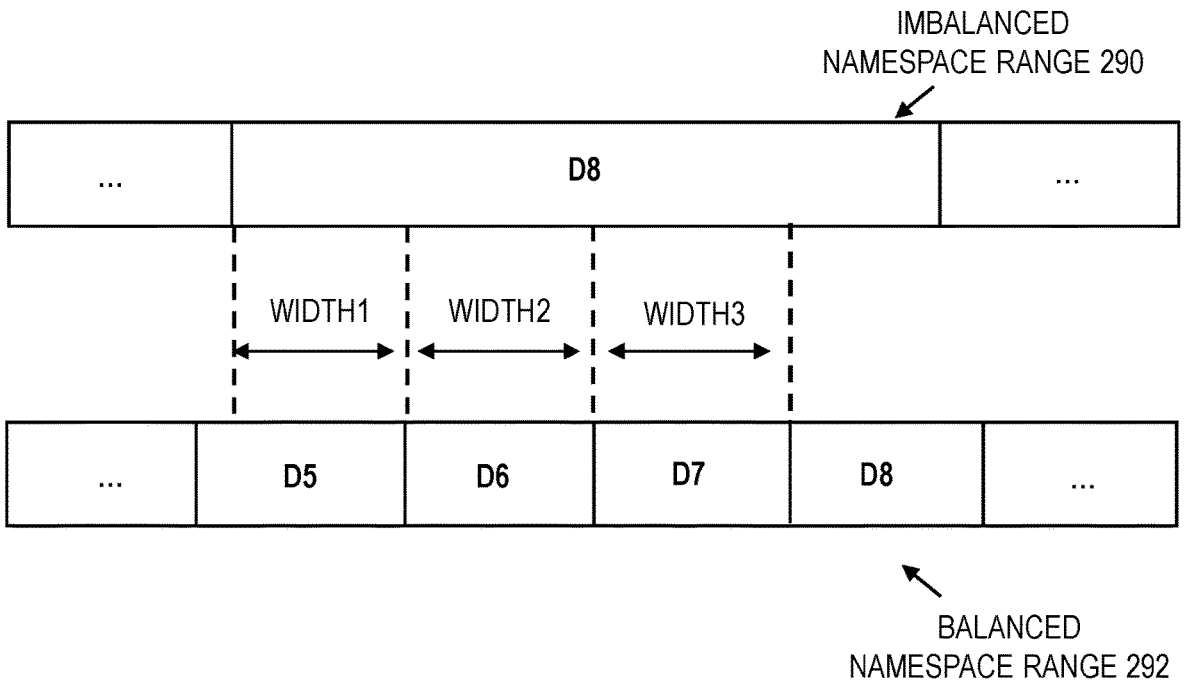
FIG. 2B depicts a block diagram illustrating further details for determining a namespace range migration cost to insert a new memory device into memory devices in a memory storage system according to one or more embodiments of the present invention.

FIG. 2B depicts an example determination of the namespace range migration cost to transfer data from an unbalanced state of an example imbalanced namespace range 290 for memory devices 242 to a balanced state of a balanced namespace range 292 for the memory devices, according to one or more embodiments. This example illustrates how the memory device insertion code 150 is configured to determine the namespace range migration cost when rebalancing the imbalanced namespace range 290 into the balanced state of the balanced namespace range 292. In this example, a memory device D8 has a greater namespace range than the other memory devices D5, D6, and D7 in the imbalanced namespace range 290. Migration of namespace range can be performed to result in the balanced namespace range 292. The migration can only happen between two adjacent memory devices in the memory device order, for example, the migration of a namespace range portion from D8 to D5 will be copied 3 times, from D8 to D7 first, then from D7 to D6, and finally from D6 to D5. The namespace migration cost of a namespace range portion is its width multiplied by how many times it has to be copied between memory devices to result in the balanced state. In FIG. 2B, the namespace range portion is width1 to be transferred from memory device D8 to memory device D5, the namespace range portion is width2 to be transferred from memory device D8 to memory device D6, and the namespace range portion is width3 to be transferred from memory device D8 to memory device D7. The distance/index between memory device D8 and the respective memory devices D5, D6, and D7 is the following: D8–D5=3, D8–D6=2, and D8–D7=1. This results in the following namespace range migration cost to rebalance memory device D8, $(3*width1)+(2*width2)+(1*width3)$. This namespace range migration determination occurs for each of the memory devices except for the candidate position of the new memory device that is to be inserted. The candidate position is tried at each possible insertion position for the memory devices in order to find the insertion position with the lowest namespace range migration cost, such that the new memory device is inserted at the insertion position with the lowest namespace range migration cost. Further details are discussed herein.

Figure 3B:
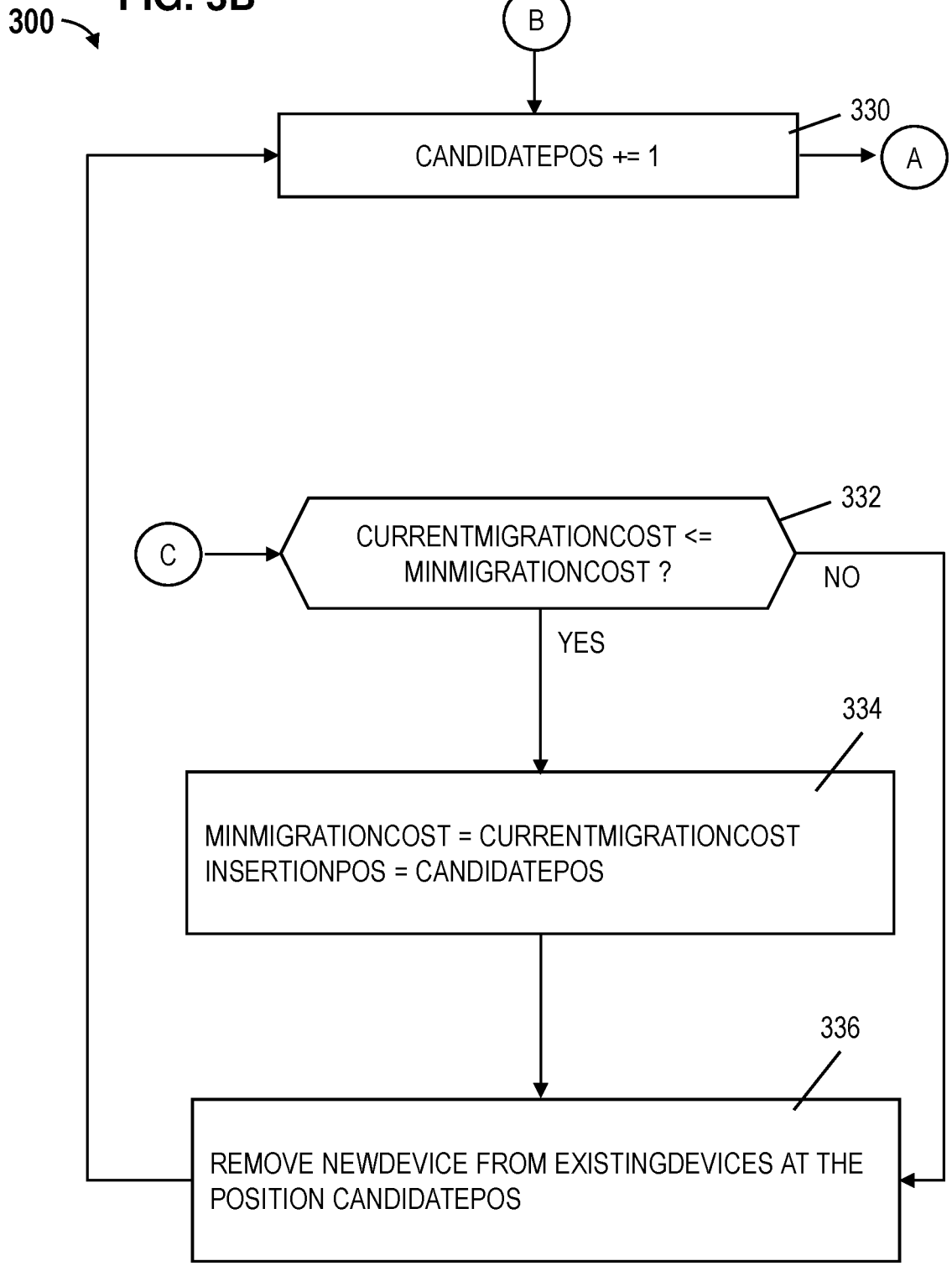

FIGS. 3A and 3B depict a flowchart of a computer-implemented method 300 to determine an insertion position for inserting a new memory device 242 into a memory storage system 240 for the storage routers 230 according to one or more embodiments. The memory device insertion code 150 of computer 101 can determine the insertion position to insert the memory device 242 with the minimum namespace range migration cost, thereby resulting in copying the least data to achieve a balanced state for the namespace range. In one or more embodiments, the memory device insertion code 150 can cause the new memory device to be inserted at the determined position. In one or more embodiments for an example storage system (which can be a computer such as the computer 101), the new memory device can be inserted into any physical slot inside the computer board. The position that the new memory device is inserted is referred to as the position of the memory device order, which is a logical order of memory devices other than the order of the physical slots inside the computer hardware. This memory device order decides which memory device owns which sequence of namespace range portion (e.g., memory device 0 owns the namespace range portion 0, the memory device 1 owns the portion 1, the memory device 2 owns the portion 2, and so forth). Only the memory devices adjacent to each other in the memory device order can migrate namespace range between them because the namespace range portions they own are adjacent to each other. The memory device insertion code 150 is configured not to consider illegal positions and/or to exclude illegal positions for inserting a memory device. If two memory devices adjacent in the memory device order are offline (i.e., non-operational), the memory device insertion code 150 cannot insert a new memory device 242 in between the two offline memory devices, because data cannot be copied from an offline memory device to an operational memory device. The position between two offline memory devices is an illegal position for inserting a new memory device. This is because the namespace range can only be migrated between the adjacent memory devices in the memory device order.

At block 302, the memory device insertion code 150 is initialized and/or started to perform the get insertion process, which uses new memory device 242 that is to be inserted, the collection of existing memory devices 242 that are already positioned in the memory device order and operating in any one of the memory storage systems 240A-240N, and the collection of illegal positions in the memory device order that are excluded from any candidate insertion positions for the new memory device 242. The memory device insertion code 150 (only) considers the legal positions for inserting a new memory device as possible candidate insertion positions.

At block 304, the memory device insertion code 150 is configured to collect the information on all the storage routers 230A-230N by the runtime configurable storage types.

At block 306, the memory device insertion code 150 is configured to initialize variables for determining the insertion position for the new memory device 242, which includes initially setting the candidate position to zero (e.g., candidatePos=0), initially setting the insertion position to zero (e.g., insertionPos=0), and initially setting the minimum migration cost (e.g., minMigrationCost) to the maximum migration value (e.g., minMigrationCost=MAX_VALUE). The candidate position is considered from the beginning and/or the first position of the memory device order, such the position 0. The output of the insertion position is the final insertion position for inserting the new memory device. At the beginning, the minimum migration cost is set to maximum migration value as long as the memory device insertion code 150 finds a candidate position with a migration cost less than the maximum migration value so that the memory device insertion code 150 can set the minimum migration cost into the new migration cost and put the corresponding insertion position as the candidate position. The maximum migration value can be predetermined in advance.

At block 308, the memory device insertion code 150 is configured to check whether the candidate position, which starts at insertion position 0, is less than or equal to the size of the existing devices. Given the size or number of the existing memory devices 242 as "M", throughout the process, the candidate position can be looped through the index/insertion positions from 0 to M, where M is the index size of the existing memory devices 242 and where the candidate position will represent each of the possible insertion positions 0-M.

At block 310, when (YES) the candidate position has a value less than or equal to the index size of the existing memory devices 242, the memory device insertion code 150 is configured to check whether any illegal positions include the candidate position.

At block 330, when (YES) any illegal position includes/coincides with the candidate position, the memory device insertion code 150 is configured to increment the value of the candidate position by 1. For example, if the candidate position has an index value of 5 and the illegal position has an index value of 5, then the candidate position is incremented by 1 to the index value of 6.

At block 312, when (NO) none of the illegal positions include/coincide with the candidate position, the memory device insertion code 150 is configured to insert the new memory device 242 into the existing memory devices 242 at the candidate position and is configured to set the current migration cost to 0 (e.g., currentMigrationCost=0). At the beginning of the process, the candidate position will be 0. Further processing continues using these settings.

At block 314, the memory device insertion code 150 is configured to check for any storage router 230 in the router collection, such that a loop 315 is performed for each storage router 230 in the router collection. In one or more embodiments, there could be multiple storage routers 230A-230N in the router collection, and the loop 315 executes using the current candidate position for each of the storage routers 230 in the router collection until there are no more storage routers in the router collection.

At block 316, the memory device insertion code 150 is configured to get the namespace range for a given storage router 230 in the router collection and calculate the given storage router's balanced distribution that includes the balanced ranges among the existing memory devices 242 based on the capacities of the existing memory devices 242. For any storage router in the router collection, each router has a namespace range. For any storage router 230 in the router collection, the balanced distribution of that router is calculated based on its namespace range to provide a balanced state. In one or more embodiments, the memory devices 242 may each have the same capacity such as, for example, X terabytes. In one or more embodiments, some memory devices may have a different capacity. Any suitable techniques for calculating a balanced distribution of balanced namespace ranges for memory devices for a storage router can be utilized as understood by one of ordinary skill in the art. An example is found in U.S. Pat. No. 10,365,968 assigned to International Business Machines Corporation. The block 316 results in balanced widths of the namespace range for each of the memory devices, for example, as depicted in FIG. 5.

FIG. 5 illustrates an example actual index 502 of actual namespace ranges for memory devices 242 for a storage router 230 and an example balanced index 504 of balanced namespace ranges of the memory devices 242 for the storage router 230. The namespace range of a storage router defines the unique symbols or names for the resources supported by this storage router. The namespace range can be the range of addresses (e.g., memory addresses) for the storage router, where the balanced index 504 illustrates that the indexes equally support the addresses of the namespace range across the memory devices 242 for the storage router 230. In other words, the namespace range distribution is balanced across the memory devices 0-M. Usually, the addresses are in hexadecimal notation but any name/symbol can be utilized. For the balanced index 504, the (whole) namespace range width W is from 0x0000 to 0xFFFF, for example, from a first memory address to a last memory address. For the balanced index 504, each index or each memory device 242 has the same or equal width of the namespace range when all the memory devices have the same capacity. In other words, the same number and/or substantially the same number of addresses for storing data is assigned to each memory device 242.

The actual index is the current state of the namespace range in the memory devices 242, which is the actual state of the memory devices 242 prior to balancing. The balanced state is the desired state after balancing the memory devices 242, which is the state of the namespace range that is aspired for the memory devices 242. Below the namespace range migration cost is calculated for each storage router.

Figure 4B:
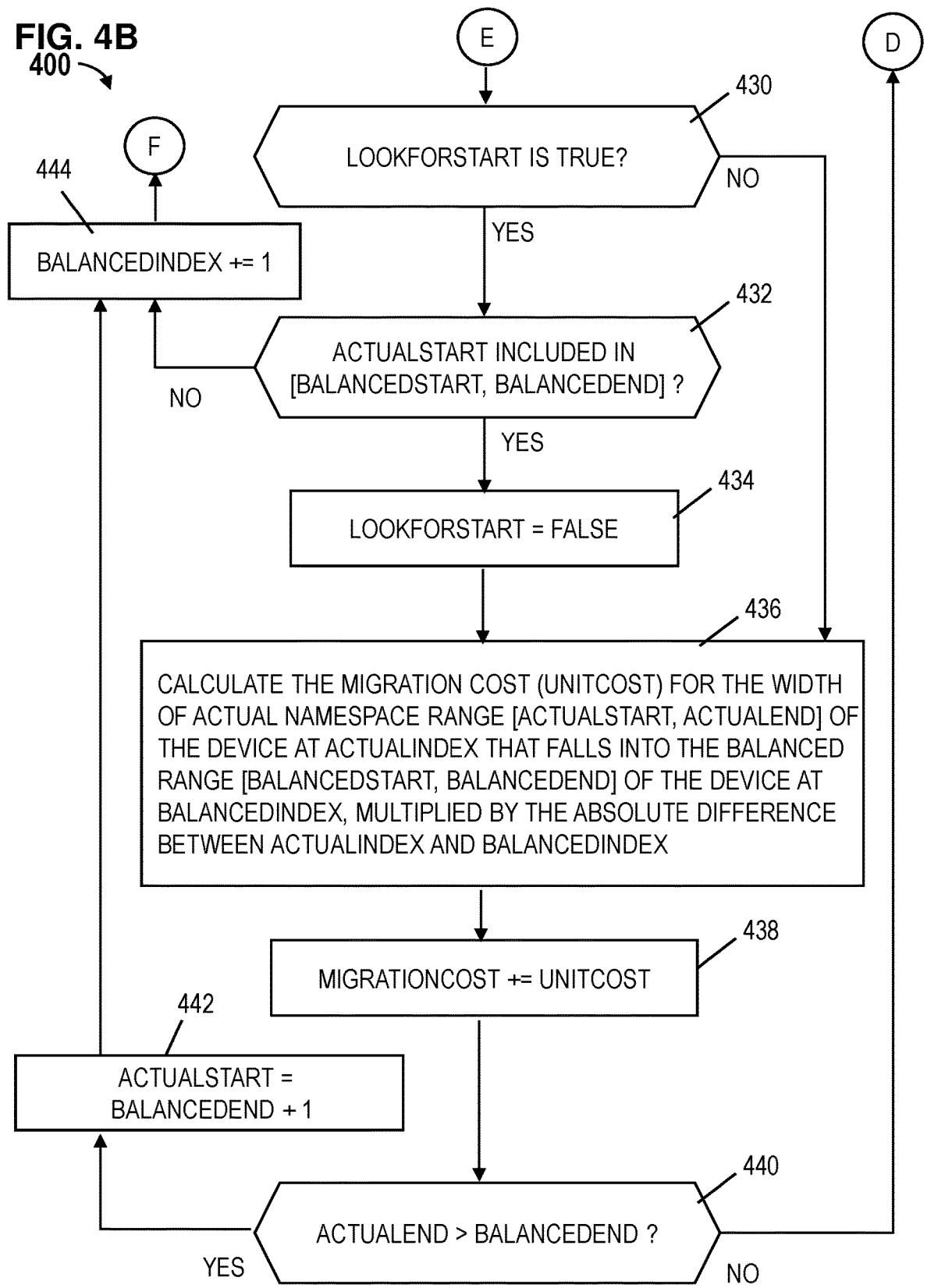

Referring back to FIGS. 3A and 3B, at block 318, the memory device insertion code 150 is configured to determine the current migration cost (e.g., currentMigrationCost (candidatePos, router, balancedRanges, existingDevices)). The current migration cost is determined based on the candidate position, the router, the balanced ranges, and the existing memory devices in the memory storage system 240. FIGS. 4A and 4B describe further details of determining the current migration cost for a given candidate position. The loop 315 continues for each storage router 230 in the collection of routers for the candidate position until all of the storage routers 230 have been processed for the candidate position, and the current migration cost for the candidate position per storage router 230 is stored. For example, the candidate position may be the insertion position "0", and the loop 315 is executed for the candidate position "0" for each storage router 230A-230N in the collection of routers. If there is only one storage router, the loop 315 performs for the example candidate position "0" for the one storage router.

In the actual index 502 of FIG. 5, the candidate position is illustrated as the insertion position 2 or the second position. Since the balanced ranges have been determined for the memory devices 242 of the router, the memory device insertion code 150 is configured to calculate the migration cost to migrate the namespace range from the actual state in actual index 502 into the balanced state in balanced index 504. In the actual index 502, it can be seen that index 4 or memory device 4 has a wider/greater namespace range than any other index or memory device, which means that more data will have to be migrated from the index 4 during the migration process to balance the actual index 502.

Referring back to FIGS. 3A and 3B, at block 332, when (NO) there are not any more storage routers because all the storage routers 230 in the router collection have been looped through for the current candidate position, the memory device insertion code 150 is configured to check if the current migration cost is less than or equal to the minimum migration cost. If not (NO), the flow proceeds to block 336.

At block 334, when (YES) the current migration cost is less than or equal to the minimum migration cost, the memory device insertion code 150 is configured to set the minimum migration cost equal to the current minimum migration cost and set the insertion position to the candidate position (e.g., minMigrationCost=currentMigrationCost, insertionPos=candidatePos).

At block 336, the memory device insertion code 150 is configured to remove the new device from the existing memory devices at the position of the candidate position. This is in preparation to check another candidate position.

At block 330, the memory device insertion code 150 is configured to increment the candidate position (candidatePos) by 1. For example, if the previously tested candidate position was "0", the next candidate position would be "1".

Flow returns to block 308, the memory device insertion code 150 is configured to check whether the candidate position is less than or equal to the size of the existing devices. When the candidate position is less than or equal to the size or number of the existing memory devices 242, the flow continues to block 310 using the candidate position.

It should be appreciated that the memory device insertion code 150 will step through all of the (legal) candidate positions. At block 320, when the candidate position is greater than the size or number of the existing memory devices 242 (i.e., all the candidate positions for inserting a new memory device 242 have been tried), the memory device insertion code 150 is configured to return the insertion position (e.g., insertionPos) with the lowest migration cost. The memory device insertion code 150 is configured to compare the migration costs that have been determined to select the insertion position with the lowest migration cost. In one or more embodiments, the memory device insertion code 150 can cause data among the memory devices 242 to be migrated to achieve the balanced state in the balanced index 504.

FIGS. 4A and 4B depict a flowchart of a computer-implemented method 400 to determine the current migration cost for a given candidate position for inserting a new memory device 242 into a memory storage system 240 for a storage router 230 according to one or more embodiments. The memory device insertion code 150 is configured to perform computer-implemented method 400. FIGS. 4A and 4B further detail block 318 discussed in FIGS. 3A and 3B.

At block 402, the memory device insertion code 150 is initialized and/or started to perform get migration cost using the candidate position, the storage router, the balanced ranges, and the existing devices which includes the new memory device inserted into the candidate position at block 312.

At block 404, the memory device insertion code 150 is configured to set the migration cost to 0, set the balanced index to 0, and set the actual index to 0 (e.g., migrationCost=0, balancedIndex=0, actualIndex=0). In FIG. 5, both the actual index 502 of actual namespace ranges and the balanced index 504 of balanced namespace ranges start from 0. As noted herein, the actual index is the current state of the namespace range in the memory devices, which is the actual state of the memory devices 242 in a memory storage system 240. The balanced state is the desired state after balancing the memory devices, which is the state of the balanced namespace range that is aspired for the memory devices 242.

At block 406, the memory device insertion code 150 is configured to check if the actual index is less than the size of the existing memory devices 242. For explanation purposes, an example scenario is that M=5 in FIG. 5. This means that the size of the existing memory devices 242 is 6 devices (e.g., M+1), for example, memory devices 0, 1, 2, 3, 4, and 5. Initially, the value of the actual index starts from 0, and there are 5 actual indexes plus the index of the candidate position for the new memory device.

At block 408, when (YES) the actual index is less than the size/number of the existing memory devices 242, the memory device insertion code 150 is configured to compare if the actual index is equal to the candidate position (e.g., actualIndex==candidatePos). When (YES) the actual index is equal to the candidate position, the flow proceeds to block 418 without the calculation of migration cost since the new memory device is inserted into the candidate position and its actual namespace range width is 0.

At block 410, when (NO) the actual index is not equal to the candidate position, the memory device insertion code 150 is configured to get the actual namespace range of the memory device at the actual index of existing memory devices from the storage router 230 and get the start (actual start) and the end (actual end) of this namespace range. In the example scenario of FIG. 5, the candidate position is 2, while the actual index is 0. Accordingly, the candidate position 2 is not equal to the actual index 0. In the example scenario, the memory device insertion code 150 is configured to get the actual start and actual end of the actual namespace range for the example actual index 0, as depicted in the actual index 502 of FIG. 5. The actual namespace range for the actual index 0 has a width, for example, from one memory address to another memory address.

At block 412, the memory device insertion code 150 is configured to set the look for start equal to "true". Look for start is initialized as true.

At block 414, the memory device insertion code 150 is configured to check if the balanced index is less than the size of the balanced ranges. Initially, the balanced index also starts from 0, and the total number of balanced ranges are 6. In the example scenario, there are 6 balanced ranges in the balanced index 504, which are balanced indexes 0, 1, 2, 3, 4, M, where M=5. When (NO) the balanced index is not less than the size of the balanced ranges, flow proceeds to block 418.

At block 416, the memory device insertion code 150 is configured to get the balanced namespace range of the memory device at the balanced index of balanced ranges and get the start (balanced start) and the end (balanced end) of this namespace range. Continuing the example scenario, analogous to block 410, the memory device insertion code 150 is configured to get the balanced start and balanced end of the balanced namespace range for the example balanced index 0, as depicted in the balanced index 504 of FIG. 5. The balanced namespace range for the balanced index 0 has a width, for example, from one memory address to another memory address.

At block 430, the memory device insertion code 150 is configured to check if look for start is true. Initially, look for start was set as true. This means that the memory device insertion code 150 is to evaluate the balanced index. When (NO) look for start is not true, flow proceeds to block 436.

At block 432, when (YES) look for start is true, the memory device insertion code 150 is configured to check whether the actual start is included in the balanced namespace range [balanced start, balanced end]. In the example scenario, the memory device insertion code 150 is configured to check whether the actual start of the actual index 0 is included in [balanced start, balanced end] of the balanced index 0, which it is. As can be seen, FIG. 5 illustrates that the actual start of the actual index 0 is included in [balanced start, balanced end] of the balanced index 0. For example, the actual start of the actual index 0 is at the same memory address as the balanced start of the balanced index 0 in FIG. 5.

At block 434, when (YES) the actual start is included in the balanced namespace range [balanced start, balanced end], the memory device insertion code 150 is configured to set the look for start equal to false. When (NO) the actual start is not included in [balanced start, balanced end], flow proceeds to block 444 to increase the balanced index by 1.

At block 436, the memory device insertion code 150 is configured to calculate the migration cost (unit cost) by the width of the actual namespace range [actual start, actual end] of the memory device at the actual index that falls into (the width of) the balanced namespace range [balanced start, balanced end] of the memory device at the balanced index, multiplied by the absolute difference between the actual index and the balanced index. As seen in FIG. 5, the (entirety of the) width of the actual namespace range for the actual index 0 is within the width of the balanced namespace range for the balanced index 0; as such, the actual namespace range for the actual index 0 does not need to be migrated into the balanced namespace range for the balanced index 0 because the actual namespace range for the actual index 0 is already there. Then, the unit cost is 0.

At block 438, the memory device insertion code 150 is configured to set the migration cost equal to the migration cost plus the unit cost (e.g., migrationCost+=unitCost, which means migrationCost=migrationCost+unitCost). Initially, the migration cost was set to 0, and now the unit cost is 0 in the example scenario for the actual index 0.

At block 440, the memory device insertion code 150 is configured to check if the actual end (value) is greater than the balanced end (value). In the example scenario of FIG. 5, the memory device insertion code 150 checks if the actual end for the actual index 0 is greater than the balanced end for the balanced index 0, and the value of the actual end is not greater than the value of the balanced end in the example scenario. As discussed herein, the namespace range starts from a first address value to a last address value, where the first address value is less than the last address value. The value of the balanced end for the balanced index 0 is greater than the actual end for the actual index 0, because the balanced index 0 encompasses a larger namespace range than the actual index 0 and they both start from the same address. Moreover, the balanced end is greater that the actual end in the example scenario.

When (NO) the actual end is not greater than the balanced end, the flow proceeds to block 418 to increase the actual index by 1.

At block 442, when (YES) the actual end is greater than the balanced end, the memory device insertion code 150 is configured to set the actual start equal to balanced end plus 1 (e.g., actualStart=balancedEnd+1). This shifts the position of the actual start.

At block 444, the memory device insertion code 150 is configured to set the balanced index to balanced index plus 1 (e.g., balancedIndex+=1).

Returning to block 418, the memory device insertion code 150 is configured to set the actual index to actual index plus 1 (e.g., actualIndex+=1). This means the actual index increased by 1.

Figure 6:
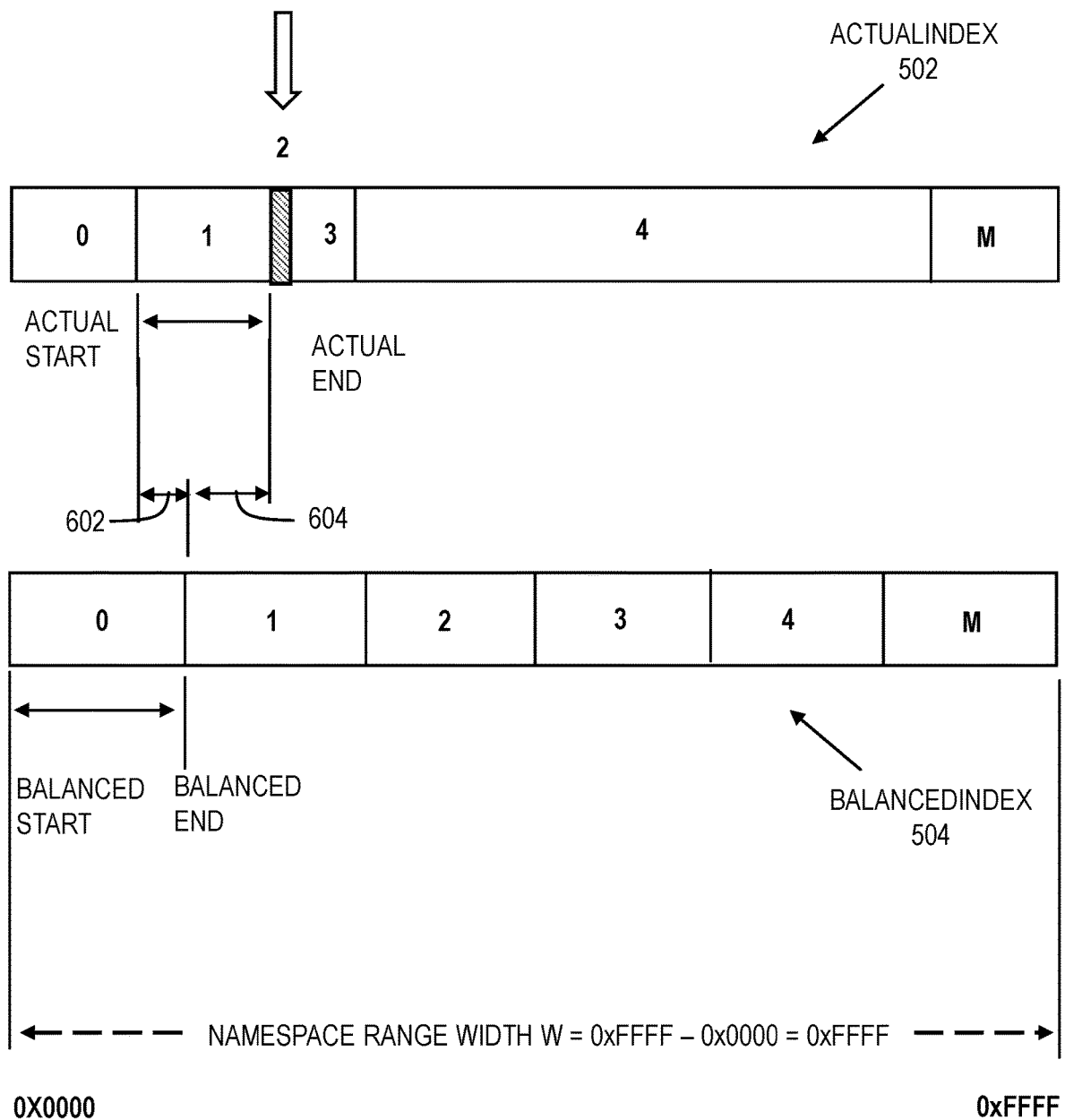
FIG. 6 depicts an example actual index of actual namespace ranges for memory devices and an example balanced index of balanced namespace ranges of the memory devices according to one or more embodiments of the present invention.

Using the example scenario in which the actual index started at 0, the actual index is incremented and becomes 1. Flow proceeds to block 406 and it is determined that the actual index 1 is smaller than the size 6 of the existing devices. Flow proceeds to block 408 and it is determined that the actual index 1 does not equal the candidate position 2. Flow proceeds to block 410, and the memory device insertion code 150 gets the actual namespace range of the actual index 1 and gets the start (actual start) and the end (actual end) of this namespace range for actual index 1 in the example scenario further depicted in FIG. 6. In FIG. 6, the candidate position is 2, while the actual index is 1. Accordingly, the candidate position 2 is not equal to the actual index 1. In the example scenario, the memory device insertion code 150 is configured to get the actual start and actual end of the actual namespace range for the example actual index 1, as depicted in the actual index 502 of FIG. 6. The actual namespace range for the actual index 1 has a width.

Flow proceeds to block 412, and look for start is set to true. Flow proceeds to block 414, and the balanced index is less than the size of balanced ranges (e.g., balanced index 0 is still less than the size of balanced ranges 6). Flow proceeds to block 416, where the memory device insertion code 150 gets the balanced namespace range of the memory device at the balanced index 0 of balanced ranges and gets the start (balanced start) and the end (balanced end) of this namespace range. Flow proceeds to block 430, and look for start is true. Flow proceeds to block 432, the memory device insertion code 150 checks whether the actual start of actual index 1 is included in the balanced namespace range [balanced start, balanced end] of balanced index 0. FIG. 6 illustrates that the actual start of the actual index 1 is included in [balanced start, balanced end] of the balanced index 0, which means that the actual start (e.g., address value) of the actual index 1 is within the balanced namespace range [balanced start, balanced end] of the balanced index 0. This means look for start is set to false at block 434. At block 436, the memory device insertion code 150 is configured to calculate the migration cost (unit cost) from the actual index 1 to balanced index 0 in the example scenario depicted in FIG. 6 which is the width of the actual namespace range [actual start, actual end] at the actual index 1 that falls into (the width) the balanced namespace range [balanced start, balanced end] of the balanced index 0, multiplied by the absolute difference between the actual index and the balanced index. As seen in FIG. 6, the actual namespace range for the actual index 1 is not entirely in the balanced namespace range for the balanced index 0, but the namespace range portion 602 should be in the balanced namespace range of the balanced index 0 for the balanced case. As such, the namespace range portion 602 of the memory device 1 will have to be migrated to the memory device 0 for balancing to a balanced state. Then, the memory device insertion code 150 adds the unit cost of migrating the namespace range portion 602 into the migration cost at block 438. Flow proceeds to block 440, and it is determined that actual end of the namespace range for actual index 1 is greater than the balanced end of the balanced namespace range for balanced index 0.

Figure 7:
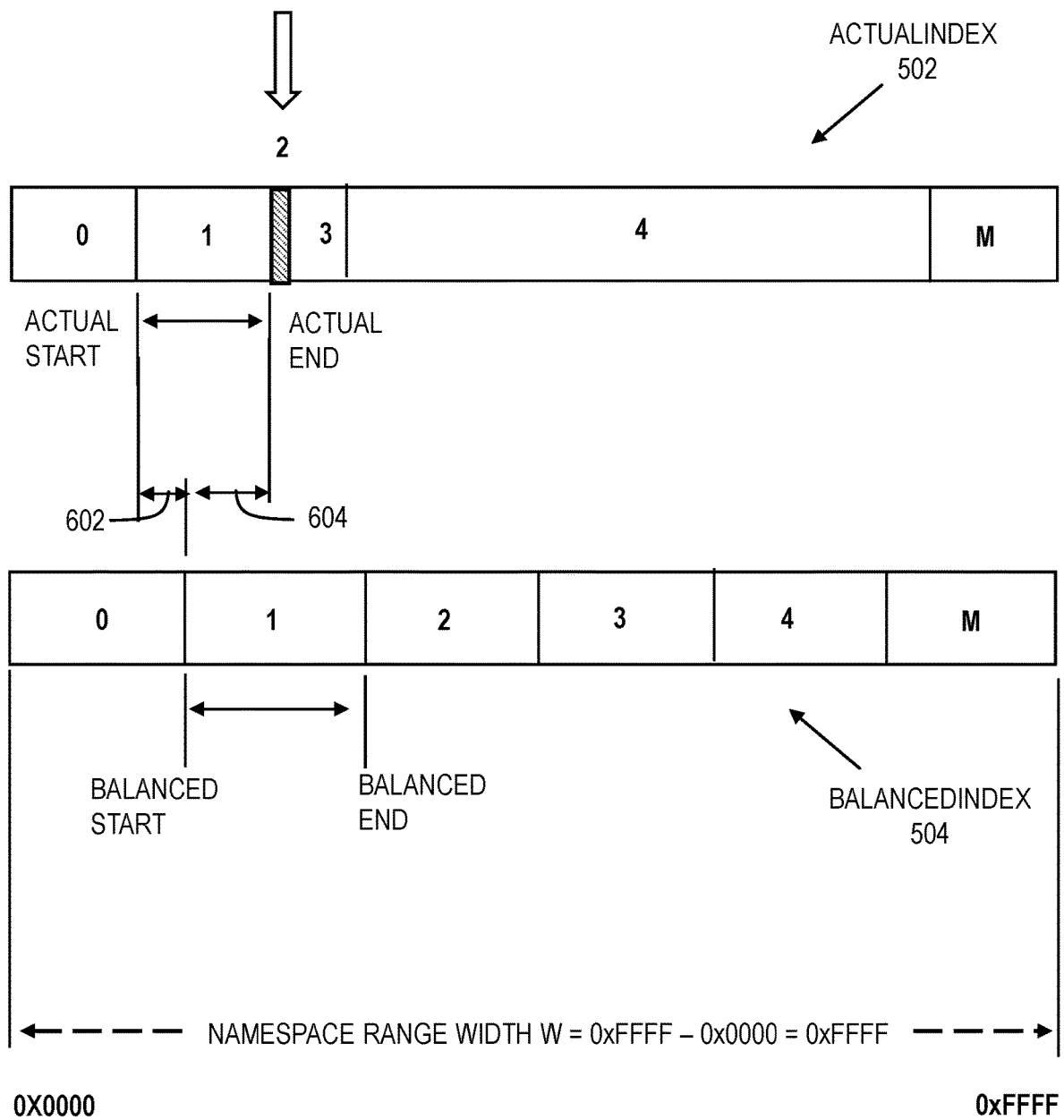
FIG. 7 depicts an example actual index of actual namespace ranges for memory devices and an example balanced index of balanced namespace ranges of the memory devices according to one or more embodiments of the present invention.

At block 442, the memory device insertion code 150 is configured to set the actual start as equal to the balanced end plus 1 (e.g., actualStart=balancedEnd+1). At block 444, the memory device insertion code 150 is configured to set the balanced index equal to the balanced index plus 1 (e.g., balancedIndex=balancedIndex+1). In the example scenario, the balanced index has been incremented to balanced index 1, and recall that the actual index is 1. This is so the evaluation can eventually consider the namespace range portion 604 that extends beyond the balanced index 0. Flow returns to block 414, and the balanced index 1 is less than the balanced ranges 6 in the example scenario. Flow proceeds block 416, where the memory device insertion code 150 gets the balanced namespace range of the memory device at the balanced index 1 and gets the start (balanced start) and the end (balanced end) of this balanced namespace range for balanced index 1. FIG. 7 depicts the balanced start and the balanced end for the balanced namespace range of the balanced index 1. Flow proceeds to block 430, and the check to look for start is true is "NO" because look for start was set to false. Accordingly, for the example scenario, flow proceeds to block 436 to calculate the migration cost for the width of the actual namespace range of the actual index 1 that falls into the balanced namespace range of the balanced index 1, multiplied by the absolute difference between the actual index and the balanced index. The memory device insertion code 150 is now calculating the migration cost for migrating the namespace range portion 604 of actual index 1 into the balanced index 1. As seen in FIG. 7, the namespace range portion 604 is already included within the balanced namespace range of the balanced index 1, so there is no ("0") migration cost for the namespace range portion 604. The namespace range portion 604 is the leftover portion of the namespace range for actual index 1, because the migration cost for the namespace range portion 602 has previously been calculated (i.e., already migrated for the purposes of evaluation and balancing the namespace range into the balanced state).

Flow proceeds to block 438, and the migration cost equals the migration cost plus the unit cost having a value 0 for the namespace range portion 604 in the example scenario. The unit cost can be considered an additional migration cost that is added to the total migration cost being determined for the candidate position. Flow proceeds to block 440, and it determines that the actual end of the actual index 1 is less than the balanced end of the balanced index 1. The memory address for the actual end of the actual index 1 is less than the value of the memory address for the balanced end of the balanced index 1 in FIG. 7. Flow proceeds to block 418, where the actual index is increased by 1. Accordingly, the example scenario has an actual index 2, a balanced index 1, and a candidate position 2.

Flow proceeds to block 406, where the actual index 2 is less than the size 6 of the existing memory devices. Flow proceeds to block 408, and it is determined that the actual index 2 is equal to the candidate position 2, and flow proceeds to block 418 to increment the actual index by 1. Accordingly, the example scenario has the actual index 3, the balanced index 1, and the candidate position 2. The actual index 3 is less than the size 6 of the existing memory devices at block 406, and the actual index 3 is not equal to the candidate position 2 at block 408.

Figure 8:
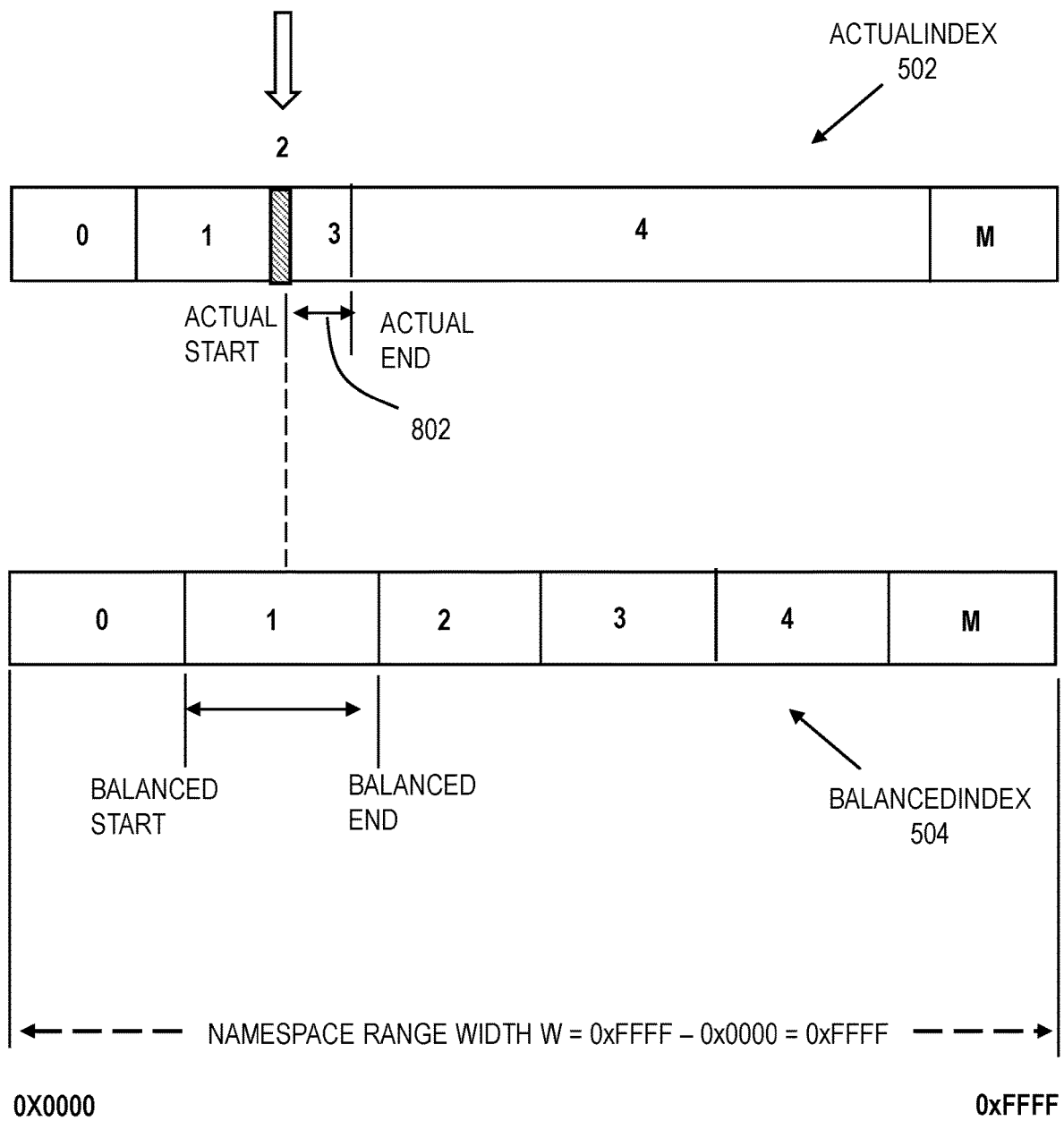
FIG. 8 depicts an example actual index of actual namespace ranges for memory devices and an example balanced index of balanced namespace ranges of the memory devices according to one or more embodiments of the present invention.

Continuing the example scenario at block 410, the memory device insertion code 150 is configured to get the actual namespace range of the memory device at the actual index 3 of existing memory devices from the storage router 230 and get the start (actual start) and the end (actual end) of this namespace range for the actual index 3. In the example scenario, FIG. 8 illustrates the actual start and actual end for the actual namespace range for the actual index 3. Look for start is set to true at block 412, and the balanced index 1 is less that the size 6 of the balanced ranges at block 414. Flow proceeds to block 416, where the memory device insertion code 150 gets the balanced namespace range of the memory device at the balanced index 1 of the balanced ranges and gets the start (balanced start) and the end (balanced end) of this namespace range for the balanced index 1. The balanced namespace range is illustrated for the balanced index 1 in the balanced index 504 in FIG. 8.

Look for start is true at block 430, and the memory device insertion code 150 checks if the actual start for actual index 3 is included in the balanced namespace range [balanced start, balanced end] for balanced index 1 at block 432. The answer is "YES" as depicted in FIG. 8. FIG. 8 shows that the actual start for actual index 3 is included in the balanced namespace range of balanced index 1. Accordingly, the look for start (process) is set to false at block 434. At block 436, the memory device insertion code 150 is configured to calculate the migration cost (unit cost) by the width of the actual namespace range [actual start, actual end] of the memory device at the actual index 3 that falls into (the width of) the balanced namespace range [balanced start, balanced end] of the memory device at the balanced index 1, multiplied by the absolute difference between the actual index and the balanced index. As seen in FIG. 8, the width of the actual namespace range (depicted as actual namespace range 802) for the actual index 3 is within the width of the balanced namespace range for the balanced index 1.

As further details of calculating the migration cost, there is one memory device between the actual index 3 (for memory device 3) and the balanced index 1 (for memory device 1), which means that the actual namespace range (e.g., actual namespace range 802) for the actual index 3 will need to be copied twice. That is, the actual namespace range 802 is copied from memory device 3 to memory device 2, and then copied again from memory device 2 to memory device 1 to be in the balanced index 1 (i.e., the memory device 1). Accordingly, the migration cost for the actual namespace range 802 of the actual index 3 would be 2 multiplied by the width of the actual namespace range 802, because the width of the actual namespace range 802 is the part that needs to be copied. Migration is performed from adjacent memory devices, and data could not be copied directly from memory 3 to memory device 1. The migration cost is the width $W_{copied}$*absolute value(actualIndex−balancedIndex). In this example scenario where the actual index is 3, the balanced index is 1, and the width copied ($W_{copied}$) is the actual namespace range 802, the migration cost=$W_{copied}$*abs(3−1)=2*$W_{copied}$. At block 438, the migration equals the (old) migration cost plus the unit cost (i.e., the migration cost just determined). After obtaining this migration cost, flow proceeds to block 440, where the memory device insertion code 150 checks if the actual end is larger than the balanced end, and the answer is "NO" in this scenario.

The actual index is incremented by 1 to the actual index 4 at block 418, the actual index 4 is less that the size 6 of the existing devices at block 406, and the actual index 4 is not equal to the candidate position 2 at block 408. At block 410, the memory device insertion code 150 is configured to get the actual namespace range of the memory device at the actual index 4 of existing memory devices from the storage router 230 and get the start (actual start) and the end (actual end) of this namespace range for the actual index 4. The balanced index is still 1.

Figure 9:
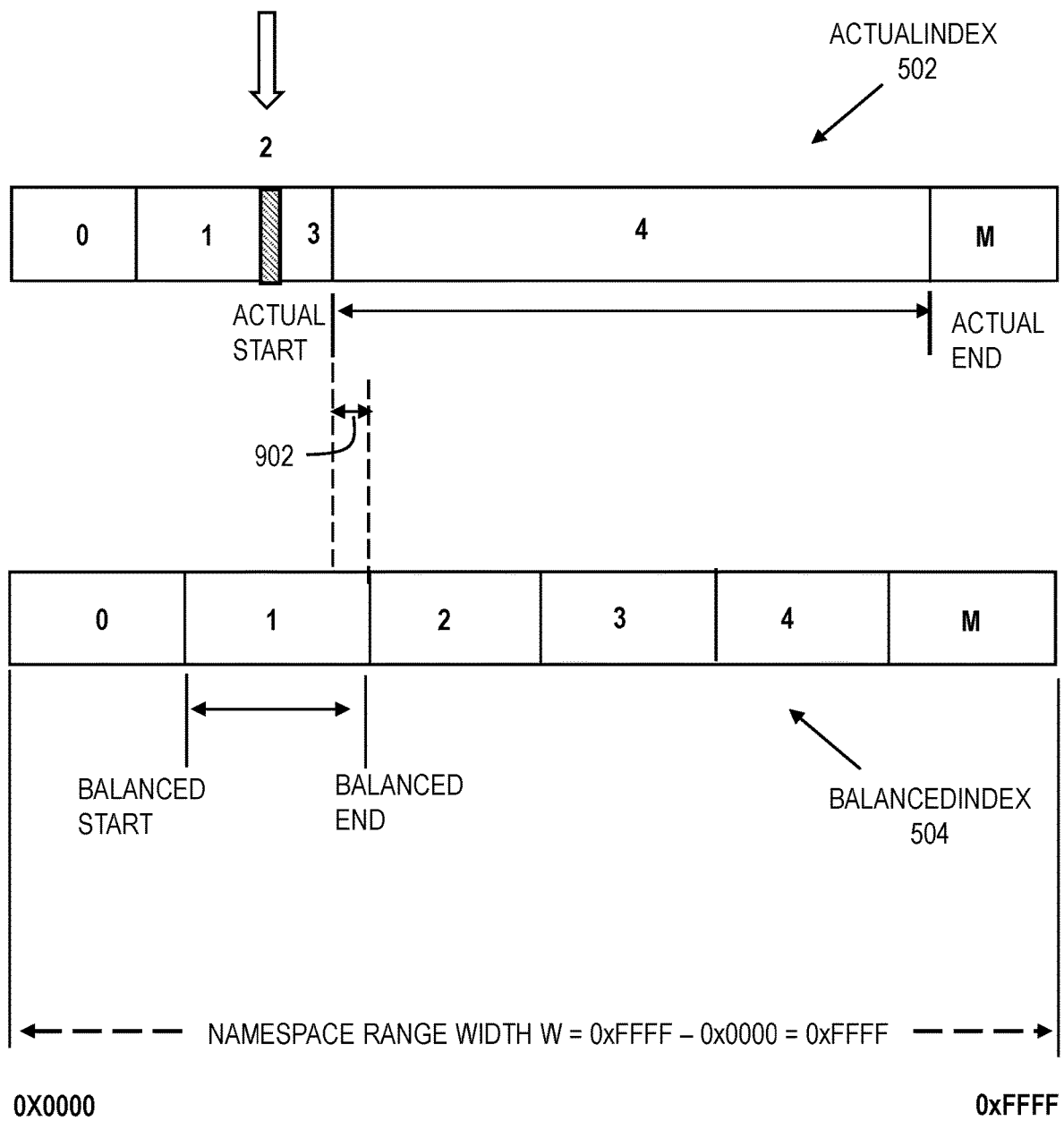
FIG. 9 depicts an example actual index of actual namespace ranges for memory devices and an example balanced index of balanced namespace ranges of the memory devices according to one or more embodiments of the present invention.

In the example scenario, FIG. 9 illustrates the actual start and actual end for the actual namespace range for the actual index 4. Look for start is set to true at block 412, and the balanced index 1 is less that the size 6 of the balanced ranges at block 414. Flow proceeds to block 416, where the memory device insertion code 150 gets the balanced namespace range of the memory device at the balanced index 1 of the balanced ranges and gets the start (balanced start) and the end (balanced end) of this namespace range for the balanced index 1. The balanced namespace range for the balanced index 1 in the balanced index 504 is illustrated in FIG. 9.

Figure 10:
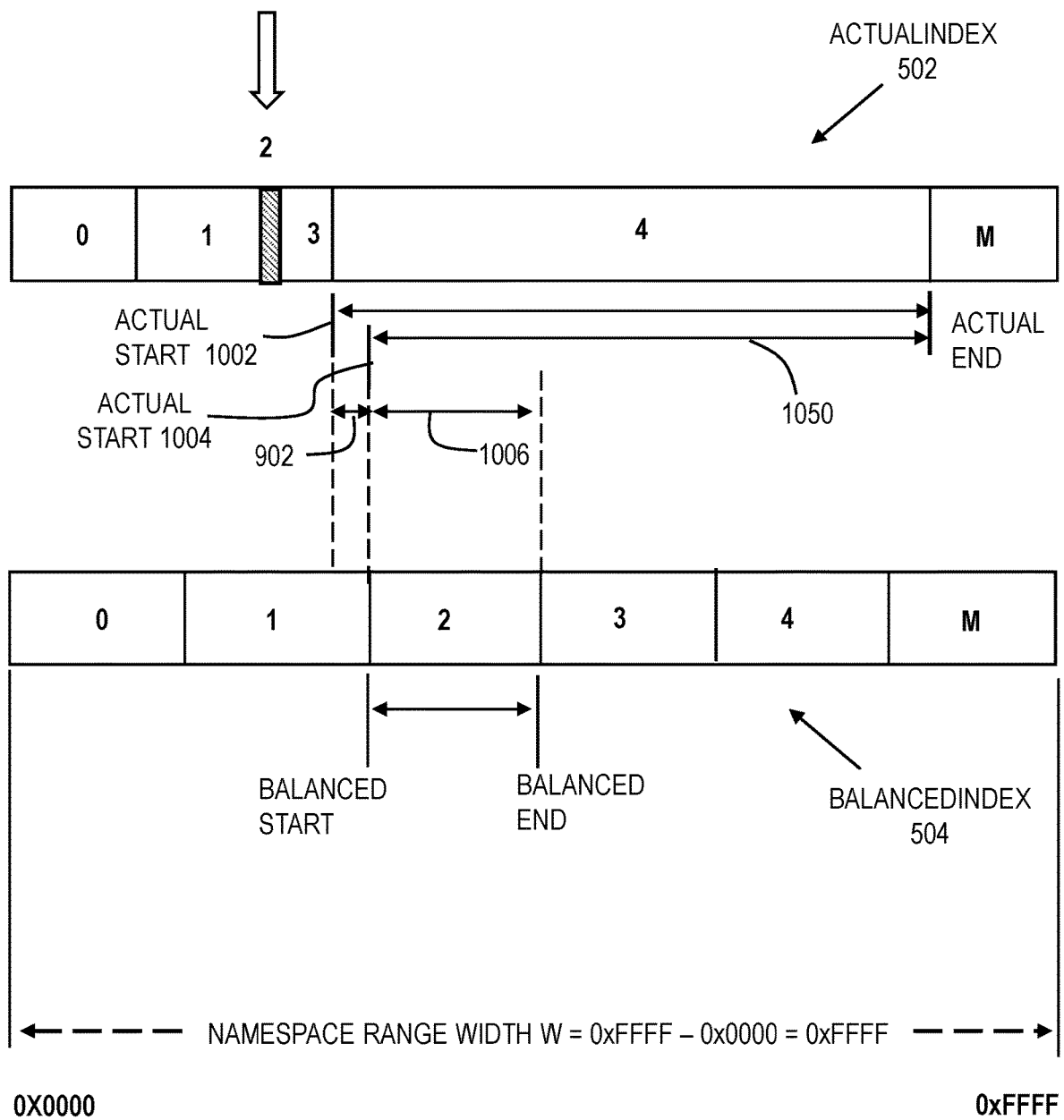
FIG. 10 depicts an example actual index of actual namespace ranges for memory devices and an example balanced index of balanced namespace ranges of the memory devices according to one or more embodiments of the present invention.

Look for start is true at block 430, and the memory device insertion code 150 checks if the actual start for actual index 4 is included in the balanced namespace range [balanced start, balanced end] for balanced index 1 at block 432. The answer is "YES" as depicted in FIG. 9. FIG. 9 shows that the actual start for actual index 4 is included in the balanced namespace range of balanced index 1. Accordingly, the look for start is set to false at block 434. At block 436, the memory device insertion code 150 is configured to calculate the migration cost (unit cost) by the width of the actual namespace range [actual start, actual end] of the memory device at the actual index 3 that falls into (the width of) the balanced namespace range [balanced start, balanced end] of the memory device at the balanced index 1, multiplied by the absolute difference between the actual index and the balanced index. The memory device insertion code 150 calculates the migration cost for the namespace range portion 902 (as the width $W_{copied}$) from actual index 4 (e.g., memory device 4) into balanced index 1 (e.g., memory device 1). The difference between the actual index 4 and balanced index 1 is 3 (absolute value(actualIndex−balancedIndex)=(4−1)=3), which means that the width $W_{copied}$ for the namespace range portion 902 is copied 3 times. The migration cost is width $W_{copied}$*absolute value(actualIndex−balancedIndex) =$W_{copied}$*(4−1)=$W_{copied}$*3. The width $W_{copied}$ for the namespace range portion 902 is copied from memory device 4 to memory device 3, copied from memory device 3 to memory device 2, and finally copied from memory device 2 to memory device 1. Flow proceeds to block 440 where it is determined that the actual end of the actual index is larger than the balanced end of the balanced index (e.g., the actual end of the actual index 4 is larger than the balanced end of the balanced index 1). Accordingly, flow proceeds to block 442 where the actual start is set to the balanced end of the balanced index 1 plus 1, which means that the actual start has been updated. FIG. 10 illustrates that the actual start 1002 has been updated to the actual start 1004. Flow proceeds to block 444, where the balanced index is incremented by 1. At block 414, the balanced index is less than the size of the balanced ranges (e.g., balanced index 2 is less than the size of balanced ranges 6). Flow proceeds to block 416, where the memory device insertion code 150 gets the balanced namespace range of the memory device at the balanced index 2 of balanced ranges and gets the start (balanced start) and the end (balanced end) of this namespace range. FIG. 10 illustrates that the balanced index has increased from balance index 1 to balanced index 2, and the balanced namespace range of the memory device 2 for the balanced index 2 has been obtained, which shows the balanced start and the balanced end of the balanced namespace range for balanced index 2.

Flow proceeds to block 430, and look for start is not true, because look for start was set to false. At block 436, the memory device insertion code 150 is configured to calculate the migration cost (unit cost) by the width of the actual namespace range [actual start, actual end] of the memory device at the actual index 4 that falls into (the width of) the balanced namespace range [balanced start, balanced end] of the memory device at the balanced index 2, multiplied by the absolute difference between the actual index and the balanced index. As seen in FIG. 10, the memory device insertion code 150 calculates the namespace range portion 1050 of the actual index 4 into the balanced index 2, but the memory device insertion code 150 determines that (only) the namespace range portion 1006 can fit into (i.e., coincides with) the balanced index 2. It should be recalled that the migration cost for namespace range portion 902 has already been calculated for migration into the balanced index 1, and so (only) the namespace range portion 1006 will be migrated into the balanced index 2 (e.g., memory device 2). In FIG. 10, the namespace range portion 1006 is the width $W_{copied}$. The namespace range portion 1006 is copied from actual index 4 to balanced index 2, which is 4−2=2. Accordingly, the migration cost is $W_{copied}$*absolute value(actualIndex−balancedIndex)=$W_{copied}$*(4−2)=$W_{copied}$*2. The namespace range portion 1006 of the width $W_{copied}$ is copied 2 times, in which namespace range portion 1006 is copied from memory device 4 to memory device 3, and then copied from memory device 3 to memory device 2. At block 438, the memory device insertion code 150 is configured to sum any previous migration cost with the unit cost (migration cost), where the unit cost is the migration cost just determined to be added to a previously stored (total) migration cost (e.g., migrationCost+=unitCost). This means that the migration cost at block 438 ensures the combinations of all previous migration costs. In FIG. 10, the actual end of actual index 4 is greater than the balanced end of balanced index 2 at block 440, so flow proceeds to block 442.

Analogous to the description of FIGS. 4A and 4B discussed herein, it is assumed that flow has proceeded to process the migration costs for all the actual indexes of the actual index 502 except for the actual index at the candidate position (e.g., candidate position 2 in this example scenario) and for all of the balanced indexes in the balanced index 504. The flow of computer implemented method 400 stops when the actual index has been incremented to M+1 (where M=5 in this example, such that 5+1=6), and the size of the existing devices is 6. For the decision at block 406, actual index 6 is not less than size 6 for the existing devices; accordingly, flow proceeds to block 420.

At block 420, when the actual index is not less than the size of the existing memory devices, the memory device insertion code 150 is configured to return the migration cost for the candidate position. This migration cost is the output at block 318. In the example scenario, migration cost for candidate position 2 is the output. Although the example scenario utilizes candidate position 2, it is noted that the computer-implemented method 400 is executed for each candidate position requested in FIGS. 3A and 3B. The migration cost is the summation of each round of migration cost determined for the actual indexes in FIGS. 4A and 4B for a given candidate position. The migration cost is the number of times that namespace range portions (i.e., data) have to be copied/migrated from one adjacent memory device 242 to the next adjacent memory device 242 in order to result in the balanced index 504 for the memory devices 242 in a memory storage system 240 for a given candidate position 2. The width $W_{copied}$ corresponds to any namespace range portion that needs to be copied from one memory device to another memory device and the scalar (i.e., number of times) indicates how many times a namespace range portion has to be copied. There can be a first $W_{copied}$ for the first namespace range portion, a second $W_{copied}$ for the second namespace range portion, a third $W_{copied}$ for the third namespace range portion, and so forth, such that for each given namespace range portion that is to be copied, the given namespace range is multiplied by the determined number of times it is to be copied in order to result in a balanced index 504 of memory devices 242 in the given memory storage system 240. As noted herein, for the given actual index being evaluated and for the given balanced index that the actual index is compared to, the migration cost is the width $W_{copied}$*absolute value(actualIndex−balancedIndex). The migration cost is summed for each actual index, the summed migration cost of all actual indices is calculated for each of candidate positions, and the candidate position with the least summed migration cost is taken as the insertion position, also the output at block 320. For the sake of explanation, it is determined that the candidate position 2 has the lowest migration cost, and accordingly, the memory device insertion code 150 output insertion position 2 (corresponding to candidate position 2) at block 320.

For FIGS. 4A and 4B, if there are N memory devices, the actual index will loop from 0 to N−1 for a total of N elements; the balanced index will loop from 0 to N−1 for a total of N elements, and the balanced index will not restart from 0 again (for a given candidate position). The computing complexity is an order of N+N, which is a linear computing complexity.

FIG. 11 is a flowchart of a computer-implemented method 1100 of executing a memory device insertion policy based on namespace range to determine an insertion position for inserting a new memory device 242 into memory devices 242 in a memory storage system 240 to have the minimum namespace range migration cost according to one or more embodiments. Having the minimum namespace range migration cost for inserting a new memory device into a position results in the least namespace range (data) that has to be transferred from memory device to memory device to achieve a balanced state for the namespace range, an improved time for transferring data (e.g., data can take days or weeks to transfer), the least CPU usage during the migration, the least bandwidth usage during the migration, etc.

At block 1102 of the computer-implemented method 1100, the memory device insertion code 150 is configured to determine legal positions as candidate positions for inserting a memory device 242 in a plurality of memory devices 242, for example, a memory storage system 240A. For example, block 310 is executed.

At block 1104, the memory device insertion code 150 is configured to determine a namespace range migration cost for the candidate positions based on a balanced state for a namespace range distributed across the plurality of memory devices 242, where an insertion position to insert the memory device 42 in the plurality of memory devices 242 is selectable from the candidate positions. Namespace range migration costs are determined for the candidate positions in FIGS. 4A and 4B.

At block 1106, the memory device insertion code 150 is configured to select a given candidate position (e.g., candidate position 2 in the example scenario) of the candidate positions having a minimum namespace range migration cost, the minimum namespace range migration cost corresponding to a requirement to transfer data between the plurality of memory devices 242 in the memory storage system 240A to result in the balanced state for the namespace range across the plurality of memory devices 242 in the memory storage system 240A.

At block 1108, the memory device insertion code 150 is configured to cause the given candidate position (e.g., candidate position 2 in the example scenario) to be the insertion position (e.g., insertion position 2 corresponding to the candidate position 2) to insert the (new) memory device 242 in the plurality of memory devices 242 of memory storage system 240A for storage router 230A.

At block 1110, the memory device insertion code 150 is configured to, responsive to inserting the memory device at the insertion position in the plurality of memory devices, cause a transfer of the data (e.g., transfer the collection of the various namespace range portions determined in FIGS. 4A and 4B for the namespace range migration cost to result in a balanced state, such as the balanced index 504 of memory devices 242) in the plurality of memory devices in accordance with the insertion position of the memory device. The memory device insertion code 150 can cause the new memory device 242 to be physically inserted in the insertion position (e.g., insertion position 2) between adjacent memory devices 242 in insertions positions 1 and 3, such that the new memory device 242 at insertion position 2 is operatively connected to the adjacent memory devices 242 in insertions positions 1 and 3.

Further, the namespace range (e.g., the namespace range width W) is in the balanced state for the plurality of memory devices 242. The width of namespace range portion that each memory device owns is the width of whole namespace range multiplied by the ratio of this memory device capacity to the summation of all memory device capacities. If all the memory devices have the same capacity, they each own equal widths of namespace range portions. Determining the namespace range migration cost for the candidate positions based on the balanced state for the namespace range distributed across the plurality of memory devices includes: determining at least one namespace range portion related to at least one of the plurality of memory devices; and determining a number of times the data corresponding to the at least one namespace range portion has to be copied in the plurality of memory.

The given candidate position (e.g., candidate position 2 in the example scenario) having the minimum namespace range migration cost is selected based on having to copy the data (e.g., transfer data for the collection of the various namespace range portions determined in FIGS. 4A and 4B for the namespace range migration cost to result in a balanced state, such as the balanced index 504 of memory devices 242) the fewest number of times when transferring the data from one of the plurality of memory devices to another one of the plurality of memory devices to result in the balanced state.

The namespace range corresponds to a range of memory addresses assigned for storage in the plurality of memory devices 242; a width of a namespace range portion of the namespace range that the memory device 242 owns is expressed by an entire width of the namespace range multiplied by a ratio of a memory device capacity of the memory device to a summation of all memory device capacities in the plurality of memory devices 242; and in response to the plurality of memory devices having a same memory device capacity, the plurality of memory devices 242 own namespace range portions having equal widths. The plurality of memory devices are operatively coupled in a memory storage system (e.g., memory storage system 240A). The insertion position for the memory device is adjacent to at least one of the plurality of memory devices, such that at least a portion the data being transferred is stored in the memory device. For example, the insertion position 2 for the new memory device 242 denotes that the new memory device 242 is physically connected to adjacent memory devices 242 at positions 1 and 3 in order to transfer data.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining legal positions as candidate positions for inserting a memory device in a plurality of memory devices;
   determining a namespace range migration cost for each of the candidate positions based on a balanced state for a namespace range distributed across the plurality of memory devices, wherein an insertion position to insert the memory device in the plurality of memory devices is selectable from the candidate positions;
   selecting a given candidate position of the candidate positions having a minimum namespace range migration cost, the minimum namespace range migration cost corresponding to a requirement to transfer data between the plurality of memory devices to result in the balanced state for the namespace range across the plurality of memory devices;
   causing the given candidate position to be the insertion position to insert the memory device in the plurality of memory devices; and
   responsive to inserting the memory device at the insertion position in the plurality of memory devices, causing a transfer of the data in the plurality of memory devices in accordance with the insertion position of the memory device.

2. The computer-implemented method of claim 1, wherein the namespace range is in the balanced state for the plurality of memory devices by having substantially balanced namespace ranges distributed across the plurality of memory devices.

3. The computer-implemented method of claim 1, wherein determining the namespace range migration cost for the candidate positions based on the balanced state for the namespace range distributed across the plurality of memory devices comprises:
   determining at least one namespace range portion related to at least one of the plurality of memory devices; and
   determining a number of times the data corresponding to the at least one namespace range portion has to be copied in the plurality of memory devices.

4. The computer-implemented method of claim 1, wherein the given candidate position having the minimum namespace range migration cost is selected based on having to copy the data a fewest number of times when transferring the data from one of the plurality of memory devices to another one of the plurality of memory devices to result in the balanced state.

5. The computer-implemented method of claim 1, wherein:
   the namespace range corresponds to a range of memory addresses assigned for storage in the plurality of memory devices;
   a width of a namespace range portion of the namespace range that the memory device owns is expressed by an entire width of the namespace range multiplied by a ratio of a memory device capacity of the memory device to a summation of all memory device capacities in the plurality of memory devices; and
   in response to the plurality of memory devices having a same memory device capacity, the plurality of memory devices own namespace range portions having equal widths.

6. The computer-implemented method of claim 1, wherein the plurality of memory devices are in a memory storage system.

7. The computer-implemented method of claim 1, wherein the insertion position for the memory device is adjacent to at least one of the plurality of memory devices, such that at least a portion the data being transferred is stored in the memory device.

8. A system comprising:
   a memory having computer readable instructions; and
   a computer for executing the computer readable instructions, the computer readable instructions controlling the computer to perform operations comprising:
      determining legal positions as candidate positions for inserting a memory device in a plurality of memory devices;
      determining a namespace range migration cost for each of the candidate positions based on a balanced state for a namespace range distributed across the plurality of memory devices, wherein an insertion position to insert the memory device in the plurality of memory devices is selectable from the candidate positions;
      selecting a given candidate position of the candidate positions having a minimum namespace range migration cost, the minimum namespace range migration cost corresponding to a requirement to transfer data between the plurality of memory devices to result in the balanced state for the namespace range across the plurality of memory devices;
      causing the given candidate position to be the insertion position to insert the memory device in the plurality of memory devices; and
      responsive to inserting the memory device at the insertion position in the plurality of memory devices, causing a transfer of the data in the plurality of memory devices in accordance with the insertion position of the memory device.

9. The system of claim 8, wherein the namespace range is in the balanced state for the plurality of memory devices by having substantially balanced namespace ranges distributed across the plurality of memory devices.

10. The system of claim 8, wherein determining the namespace range migration cost for the candidate positions based on the balanced state for the namespace range distributed across the plurality of memory devices comprises:
    determining at least one namespace range portion related to at least one of the plurality of memory devices; and
    determining a number of times the data corresponding to the at least one namespace range portion has to be copied in the plurality of memory devices.

11. The system of claim 8, wherein the given candidate position having the minimum namespace range migration cost is selected based on having to copy the data a fewest number of times when transferring the data from one of the plurality of memory devices to another one of the plurality of memory devices to result in the balanced state.

12. The system of claim 8, wherein:
    the namespace range corresponds to a range of memory addresses assigned for storage in the plurality of memory devices;
    a width of a namespace range portion of the namespace range that the memory device owns is expressed by an entire width of the namespace range multiplied by a ratio of a memory device capacity of the memory device to a summation of all memory device capacities in the plurality of memory devices; and
    in response to the plurality of memory devices having a same memory device capacity, the plurality of memory devices own namespace range portions having equal widths.

13. The system of claim 8, wherein the plurality of memory devices are in a memory storage system.

14. The system of claim 8, wherein the insertion position for the memory device is adjacent to at least one of the plurality of memory devices, such that at least a portion the data being transferred is stored in the memory device.

15. A computer program product comprising a computer readable storage medium having program instructions embodied therewith, the program instructions executable by a computer to cause the computer to perform operations comprising:
    determining legal positions as candidate positions for inserting a memory device in a plurality of memory devices;
    determining a namespace range migration cost for each of the candidate positions based on a balanced state for a namespace range distributed across the plurality of memory devices, wherein an insertion position to insert the memory device in the plurality of memory devices is selectable from the candidate positions;
    selecting a given candidate position of the candidate positions having a minimum namespace range migration cost, the minimum namespace range migration cost corresponding to a requirement to transfer data between the plurality of memory devices to result in the balanced state for the namespace range across the plurality of memory devices;

causing the given candidate position to be the insertion position to insert the memory device in the plurality of memory devices; and responsive to inserting the memory device at the insertion position in the plurality of memory devices, causing a transfer of the data in the plurality of memory devices in accordance with the insertion position of the memory device.

16. The computer program product of claim 15, wherein the namespace range is in the balanced state for the plurality of memory devices by having substantially equal namespace ranges distributed across the plurality of memory devices.

17. The computer program product of claim 15, wherein determining the namespace range migration cost for the candidate positions based on the balanced state for the namespace range distributed across the plurality of memory devices comprises:

determining at least one namespace range portion related to at least one of the plurality of memory devices; and determining a number of times the data corresponding to the at least one namespace range portion has to be copied in the plurality of memory devices.

18. The computer program product of claim 15, wherein the given candidate position having the minimum namespace range migration cost is selected based on having to copy the data a fewest number of times when transferring the data from one of the plurality of memory devices to another one of the plurality of memory devices to result in the balanced state.

19. The computer program product of claim 15, wherein the namespace range corresponds to memory addresses assigned for storage in the plurality of memory devices.

20. The computer program product of claim 15, wherein the plurality of memory devices are in a memory storage system.

* * * * *